JIG

Filed Aug. 15, 1955 4 Sheets-Sheet 1

INVENTORS.
MICHEL C. PALMER
EDWARD W. JOHNSON
CLARANCE B. DAVIS

BY

Christie, Parker & Hale
ATTORNEYS

Nov. 11, 1958 M. C. PALMER ET AL 2,859,720

JIG

Filed Aug. 15, 1955 4 Sheets-Sheet 2

INVENTORS
MICHEL C. PALMER
EDWARD W. JOHNSON
CLARANCE B. DAVIS

BY Christie, Parker & Hale
ATTORNEYS

JIG

Filed Aug. 15, 1955 4 Sheets-Sheet 3

INVENTORS
MICHEL C. PALMER
EDWARD W. JOHNSON
CLARANCE B. DAVIS
BY
Christie, Parker & Hale
ATTORNEYS INVENTORS.
MICHEL C. PALMER
EDWARD W. JOHNSON
CLARANCE B. DAVIS
BY
Christie, Parker & Hale
ATTORNEYS 2,859,720

JIG

Michel C. Palmer, Pasadena, Edward W. Johnson, Altadena, and Clarance B. Davis, Arcadia, Calif.

Application August 15, 1955, Serial No. 528,375

3 Claims. (Cl. 113—99)

This invention relates to jigs, and it has particular reference to jig apparatus for facilitating the assembly of parts in the manufacture of electrical and mechanical assemblies requiring a high degree of precision in the mechanical placement of parts. The apparatus of the invention is especially useful in facilitating the assembly of crystal vibrators; however it may also be used to facilitate the assembly of other apparatus such as electron tubes, transistors, crystal diodes, precision switches, variable condensers, indicating meters, precision potentiometers, and so forth.

The problems arising in the assembly of crystal vibrator parts are generally typical of the nature of problems encountered with respect to the class of structures above cited, and the invention is explained in detail with reference to crystal vibrators alone because a detailed discussion of all said class of structures is both repetitious and impractical. As an introduction to the nature of these problems, it is helpful to consider first the nature of crystal vibrators.

An unusually high degree of frequency stability can be obtained by replacing the usual resonant circuit of an oscillator with a mechanically vibrating piezoelectric quartz crystal, and utilizing the piezoelectric effect to establish a connection between the electrical circuits of the oscillator and the mechanical vibrations of the crystal. Such crystal oscillators are the standard means of maintaining the frequency of radio transmitting stations at the assigned value, and they also find extensive use in the reception of signals from transmitting stations of specified frequencies, as for example, aircraft-to-ground radio communication.

Piezoelectric properties are exhibited by a number of crystal substances of which some of the most important are quartz, Rochelle salt and tourmaline. An alternating voltage applied across such a crystal will cause the crystal to vibrate and, if the frequency of the applied alternating voltage approximates a frequency at which mechanical resonance can exist in the crystal, the amplitude of the vibrations will be large. Crystals are usually cut in the form of plates from a natural crystal, and any particular crystal will have a number of natural resonant frequencies. The value of these frequencies will depend upon the dimensions of the crystal and other factors.

Crystals must be mounted in such a manner as to provide the necessary electrodes or supports, and at the same time permit the maximum freedom of vibration for the crystal. Various arrangements are used in mounting crystals and the particular arrangement concerned here is the wire-mounted crystal unit which has recently come into wide use.

In the wire-mounted crystal vibrator the electrodes are plated directly on the crystal faces by chemical action or by evaporation of metal in a vacuum, and connection is then made to the crystal through wires that are soldered to the metal surface, if possible at a nodal point. These wires ordinarily consist of a pair of relatively large support wires, and a number of mount wires connected between the support wires and the crystal. It is impractical to achieve a perfect connection of mount wires exactly at nodal points on the crystal, and in order to prevent the wires from participating in the crystal vibrations in a manner that would appreciably effect the resonant frequency, a ball of solder is placed on the mount wire at a distance from the crystal such that the mount wire offers low impedance to crystal vibrations; i. e., so that the length of mount wire between the crystal and the immobilizing solder ball approximates an odd number of quarter wave lengths to mechanical vibrations of the crystal frequency traveling down the wire. By making the mount wires small in diameter, of spring material, and providing one or two bends between the crystal and the end of the mount wire, a spring mounting is obtained that can withstand vibration and shock without affecting the behavior of the crystal.

Assembly of wire mounted crystal vibrators must necessarily be an accurate process and ordinarily involves the use of a number of jigs for accurately supporting the various components of the crystal vibrator in position during the process. Such jigs are expensive, and conventional assemblying practices employ a number of separate jigs in the assembly of each substantially different size crystal vibrator.

The present invention solves this problem by providing a universal jig apparatus in one mechanism, which may be used in the assembly of a large range of sizes and types of crystal vibrators as well as other structures, thus facilitating the manufacturing process and eliminating the expense of a multitude of conventional jigs. The invention includes a body, a dial member rotatably connected to the body, and means interposed between the dial and the body for varying the distance of the dial from the body as the dial is rotated. Means are connected to the dial for releasably supporting component parts of the structure to be assembled.

In the preferred embodiment, a shaft is utilized for rotatably and slidably connecting the dial to the body, the shaft being spring loaded to urge the dial toward the body. The dial member has a front side and a back side, with the back side being proximate to the body. A plurality of adjustable cam followers protrude from the back side of the dial, and a cam is connected to the body and disposed facing the back side of the dial for engaging the followers as the dial is rotated. Means are connected to the front face of the dial for receiving and supporting components of a crystal vibrator, and spacer means are rotatably connected to the dial for accurately positioning crystal vibrator components supported from the front face of the dial. Holder means are pivoted to the body for releasably holding additional components of the crystal vibrator accurately in position proximate to the components supported from the front face of the dial.

The invention is explained in detail with reference to a preferred embodiment shown in the drawings, in which.

Figures 1, 2:
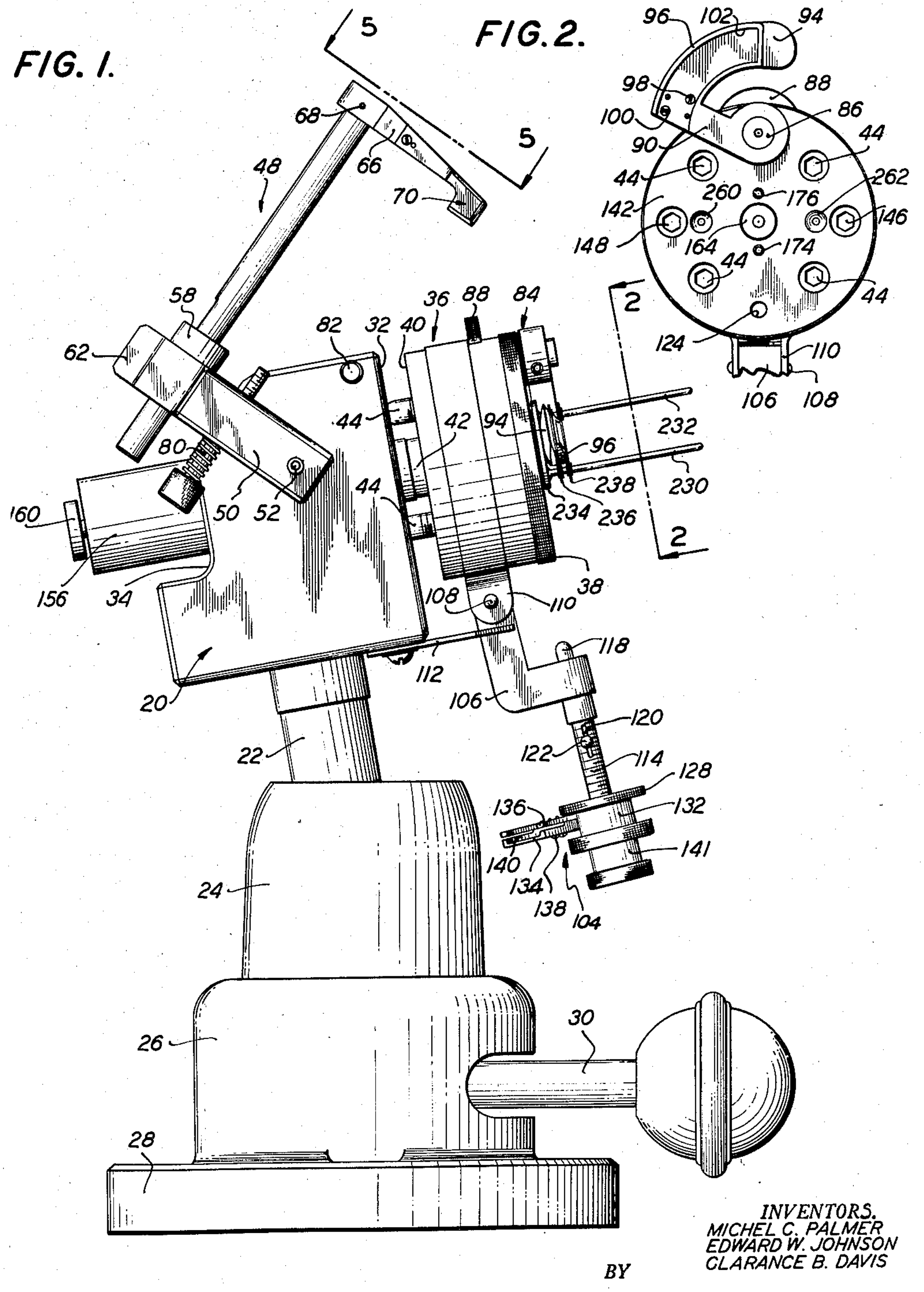
Fig. 1 is an elevational view showing the preferred embodiment of the invention.
Fig. 2 is an elevation of the front side of the dial member taken along line 2—2 of Fig. 1.

With reference to Fig. 1, a substantially rectangular body member 20 is adjustably connected by a rod 22 to a ball socket 24. The ball socket is affixed atop a supporting member 26 which is rotatably mounted to a base plate 28. A set screw 30 is provided for setting the rotatable position of the supporting member with respect to the base plate.

The body has a front side 32 and a back side 34. A dial member 36 having a front side 38 and a back side 40 is rotatably and slidably connected to the body by way of a main shaft 42, with the back side of the dial being proximate to the front side of the body. A plurality of cam followers 44 (see Figs. 1 and 2) protrude from the back side of the dial.

Figures 3, 4, 5:
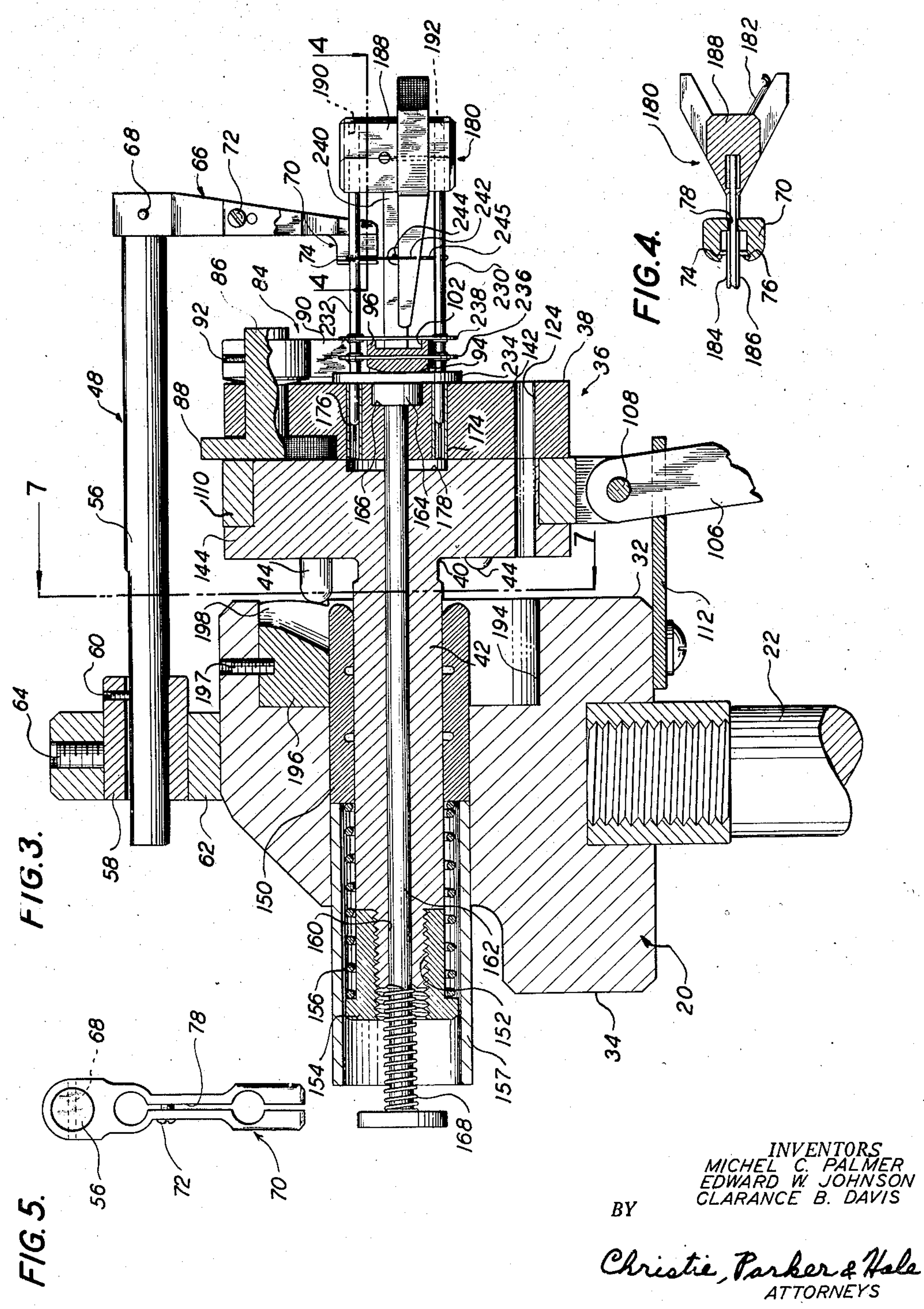
Fig. 3 is a fragmentary cross sectional view of the embodiment of Fig. 1.
Fig. 4 is a view taken along line 4—4 of Fig. 3.
Fig. 5 is an oblique view taken along line 5—5 of Fig. 1.
Figure 8:
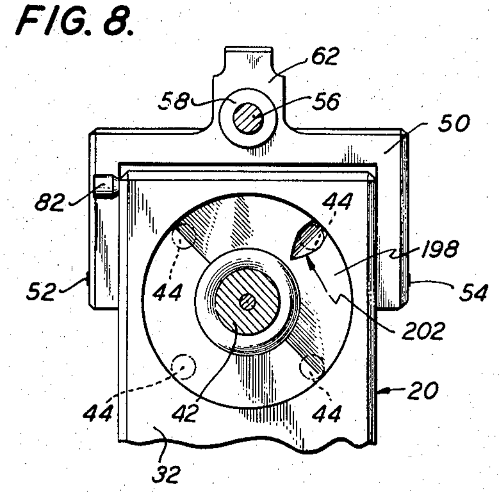
Fig. 8 is a transverse sectional elevation taken along line 8—8 of Fig. 3.

A holder means 48 is pivoted to the body. The detailed structure of the holder means is best illustrated in Figs. 3, 4 and 5. It includes a bracket 50 which spans the width of the body with each arm of the bracket pivoted at its lower end to the side of the body, as shown in Fig. 8 at 52, 54. A holder rod 56 is adjustably supported through a holder sleeve 58 by a set screw 60, the holder sleeve being held by an enlarged mid-portion 62 of the bracket 50. The holder sleeve is rotatable with respect to the mid-portion of the bracket and its position is set by a set screw 64.

A holder arm 66 is connected at one end of the holder rod by a pin 68. A U-shaped wire gripper 70 is integrally formed at the lower end of the holder arm and is adjustable by means of a screw 72. The gripper 70 has a pair of grooves 74, 76 for receiving and releasably holding mount wire in proper alignment. Also, the gripper has a vertical slot 78 to permit it to clear other crystal vibrator components when the holder means is pivoted into position, and to permit a fine adjustment of the distance between the grooves by means of the screw 72. Figs. 4 and 5 depict the shape of the gripper.

A spring loaded screw 80 extends through one side of the bracket 50 and cooperates with a protruding stop 82 on the body 20 to control the position at which the holder means comes to rest when pivoted (see Fig. 1).

With reference to Figs. 1, 2 and 3, a first spacer means 84 is rotatably connected on the front face of the dial by a spacer shaft 86 which extends part way through the dial and has a circular flange 88 which protrudes from the periphery of the dial for being conveniently engaged to rotate the spacer shaft. The first spacer means is shaped like a hooked arm disposed in a plane parallel to the front side of the disk and adjacent thereto. It includes a hub-and-radius portion 90 fixed to the spacer shaft by a set screw 92 and a pair of annular segments 94, 96 connected by screws 98, 100 to the end of the hub-and-radius portion. The annular segments of the first spacer means have prescribed thickness and separation, and the front-most annular segment 96 has a channel 102 formed in its front face.

Figure 6:
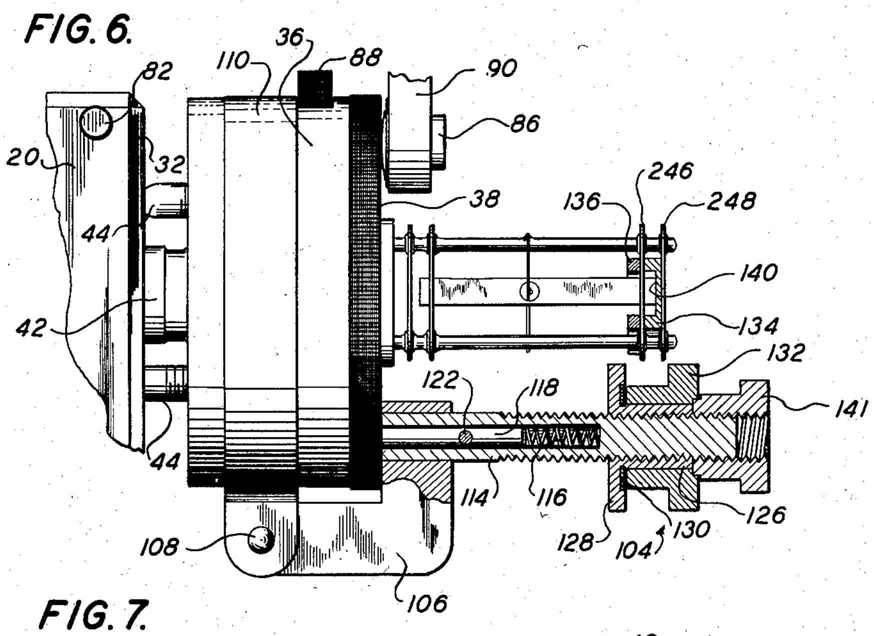
Fig. 6 is a side elevation of the dial member partly broken away to show the internal structure of a spacer means connected to the dial member.

With reference to Figs. 1 and 6, a second spacer means 104 is connected to an elbow member 106 which is pivoted by a pivot connection 108 to a band 110, the band being rotatably secured around the periphery of the dial member. A receiver plate 112 is connected to the bottom of the body and has a notch for receiving the elbow member when the second spacer means is not in use.

The connection between the second spacer means and the elbow member is made by way of a spacer rod 114 which is affixed through one end of the elbow member 106. The spacer rod has a smooth interior bore 116 which opens through the end of the spacer rod proximate to the dial in Fig. 6. A spring loaded plunger 118 is slidably contained in the smooth bore 116, and protrudes from the open end of the spacer rod. A longitudinal slot 120 opens through the side of the spacer rod into the smooth bore, and the spring loaded plunger is provided with a pin 122 which extends through the slot 120 for being engaged to retract the plunger so that it no longer protrudes from the open end of the spacer rod. The protruding portion of the plunger fits into a recess 124 which opens through the front side of the dial (see Fig. 3), and the spacer rod may be pivoted upwardly and secured normal to the front face of the dial by the protruding plunger at will.

The spacer rod 114 is threaded exteriorly and a cylindrical collar 126 is screwed onto the rod. The collar has a flange portion 128, and an annular gasket 130 is mounted on the collar adjacent the flange portion, the gasket fitting into an annular recess on the flange.

The second spacer means 104 is shaped similar to the first spacer means and includes a hub-and-radius portion 132 rotatably mounted on the cylindrical collar 126 and a pair of annular segments 134, 136 affixed to the hub-and-radius portion 132 by means of screws 138. The annular segments have prescribed thickness and separation, and the annular segment 136 most proximate to the dial is cut out along its center, with the other segment 134 having a channel 140 formed along its center and facing toward the front side of the dial. The hub of the hub-and-radius portion fits against the gasket 130 adjacent the flange of the collar, and a nut 141 is screwed onto the extreme end of the spacer rod 114 for locking the position of the collar along the length of the rod and for providing moderate frictional resistance to rotation of the second spacer means 104 by pushing the hub of the hub-and-radius portion 132 against the gasket 130.

With reference to Fig. 3, the dial member is made up of two disks, a front disk 142 and a back disk 144. The front disk is rigidly connected to the back disk by means of a pair of screws 146, 148 (Fig. 2). The main shaft 42 is formed integrally with the back disk and is slidably and rotatably mounted through the body member by a bushing 150. The shaft has a threaded portion 152 protruding axially from its back end, and a flanged nut 154 is screwed onto the threaded portion. A coil spring 156 is disposed on the main shaft and is held in compression between the bushing 150 and the flanged nut 154, thus spring loading the main shaft so that the dial member is urged toward the body. A cylindrical shroud 157 extends around the coil spring and protrudes from the back side 34 of the body.

The main shaft has an internal bore 160 extending longitudinally through it, and continuing to extend through the dial member. An ejector rod 162 is slidably contained in the bore 160, with the ejector rod having a flange 164 affixed at its forward end which is accommodated in a recess 166 in the front face of the dial. An ejector rod spring 168 urges the ejector rod in the back direction so that its flange portion 164 is urged into the recess 166.

As shown in Figs. 2 and 3, the front disk 142 of the dial has means in the form of a pair of split tubes 174, 176 extending longitudinally through it and opening through the front face of the dial for receiving and supporting support wire components of the crystal vibrator. The distance that support wire components may be inserted into the tubes may be increased by providing a recess 178 in the back disk of the dial.

Figs. 3 and 4 show clamp means 180 for grasping and positioning the crystal component of a crystal vibrator. The clamp means is similar to tweezers; however, it includes a leaf spring 182 which spring loads the prongs 184, 186 in the clamped position and also includes a mounting member 188 extending laterally of the prongs.

and having a pair of holes 190, 192 so that the member may be slid onto mounting wire components of the crystal vibrator to support the clamp in position.

The body has a large recess 194 (Fig. 3) in its front side. A cam 196 is secured in the recess 194 by means of a screw 197. The cam has a cam surface 198 which engages the cam followers 44 as the dial is rotated. The cam surface 198 has a notch 202 (Fig. 8) disposed on the highest point of the cam surface for acting as a catch for the cam followers.

Figure 7:
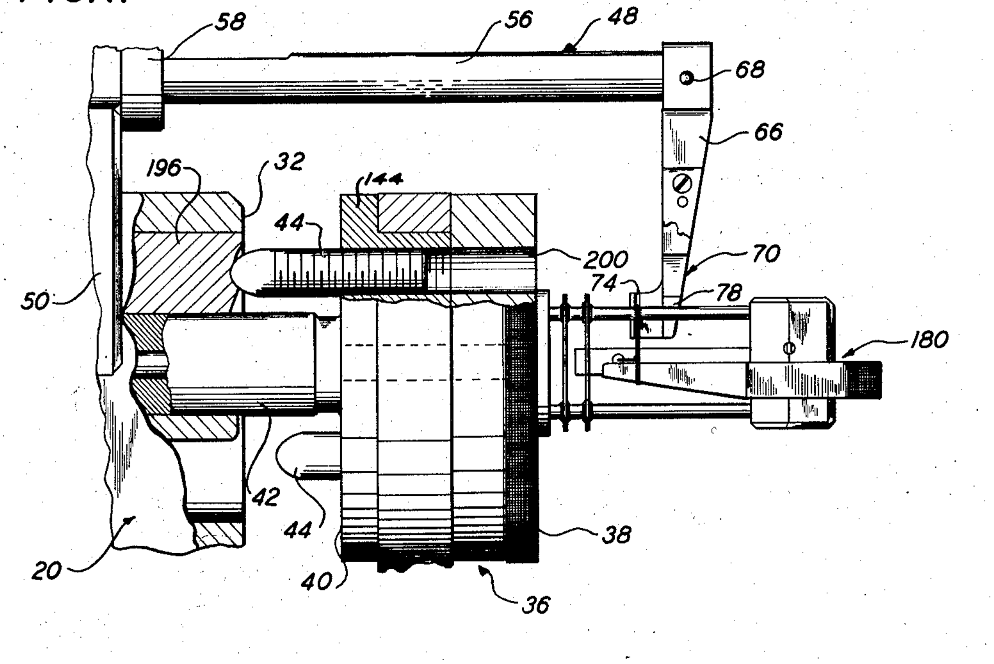
Fig. 7 is a fragmentary side view in partial section showing a typical cam follower.

With reference to Fig. 7, each cam follower 44 is shaped like an elongated screw, the screw protruding from the back side of the dial and having a rounded end. A typical cam follower bore 200 extends longitudinally through the dial for receiving each of the cam followers 44. That portion of the cam follower bore extending through the back disk 144 of the dial is threaded for engaging the threads on the cam follower, thus permitting an adjustment of the distance that the cam follower protrudes from the back side of the dial.

Figure 9:
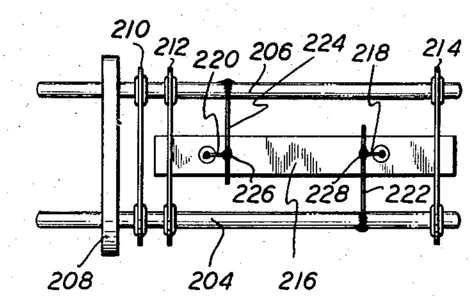
Fig. 9 is an elevation of one type of conventional crystal vibrator.

Fig. 9 shows one type of conventional crystal vibrator which may be assembled by use of the invention. The crystal vibrator comprises a pair of support wires 204, 206, a base plate 208 and insulators 210, 212, 214 fixed at spaced locations along the support wires. Other components of the crystal vibrator include a piezoelectric crystal 216 which is ordinarily provided with a conductive coating on either side of the crystal, and mount wires 218, 220 soldered as close as possible to separate nodal points on the crystal. Additional mount wires 222, 224 are soldered to the support wires and to the mount wires 218, 220 respectively, the connection between the mount wires being made in the form of solder balls, 226, 228 whose location is critical as has been previously explained.

It is not always necessary to use all of the components of the jig apparatus in the assembly of some types of crystal vibrators; however, for descriptive purposes a particular crystal vibrator is illustrated which shows the operation of all jig components.

With reference to Fig. 1, a pair of support wires 230, 232 mounted to a base plate 234 is inserted into the tubes 174, 176 in the front side of the dial. A pair of insulators 236, 238 are slipped onto the support wires 230, 232, and the first spacer means 84 is rotated so that its annular segments 94, 96 separate the insulators a predetermined distance from the base plate 234 and a predetermined distance from each other. The insulators may then be fixed to the support wires as by soldering, and to facilitate this, the dial may be rotated in various positions indexed by the cam followers.

With reference to Fig. 3, the clamp means 180 grasps a crystal 240 and is slid onto the support wires 230, 232 and pushed forward to a position where the crystal rests against the bottom of channel 102 formed in the front-most annular segment 96. The front-most insulator 238 has a central aperture (not shown) for admitting the crystal. The holder means is then pivoted down into position with the vertical slot 78 allowing the U-shaped portion to extend past the upper support wire 232. A U-shaped mount wire 242 is releasably held in the grooves 74, 76, and by proper adjustment of the holder means and the length of protrusion of the cam follower 44, this mount wire is properly positioned with respect to a mount wire 244 which extends laterally from one side of the crystal 240.

The mount wire is then soldered to the support wire, and the mount wires 242 and 244 are connected by a ball of solder. The gripper holds the U-shaped mount wire in proper position so that the solder ball is easily located a proper distance away from the crystal along the length of the mount wire 244.

The holder is pivoted upwardly, and the dial is then rotated 180°, and this process repeated to attach another mount wire 245 to the crystal. At this point the crystal is mounted and the clamp means 180 is removed.

With reference to Fig. 6, a second pair of insulators 246, 248 is slid onto the support wires. The second spacer means 104 is pivoted upwardly and the plunger 118 is allowed to insert itself into the recess 124 in the face of the dial, thus holding the second spacer means in position. By adjustment of the position of the collar 126 along the length of the screw portion of the rod 114 and rotating the second spacer means into position, the second pair of insulators are spaced properly along the length of the support wires 230, 232. The dial may be rotated to various positions so that the insulators are easily soldered to the support wires.

The second spacer means is then rotated out of contact with the second pair of insulators, and the pin 122 is engaged to retract the plunger 118, allowing the second spacer means to pivot down out of the way against the receiver plate 112.

The ejector rod 162 is then engaged to push the assembled crystal vibrator out of contact with the tubes 174, 176.

There are many instances when it is desirable to connect a number of mount wires between the support wires and points along the length of a crystal, for example as shown in Fig. 9. The cam surface engages the cam followers as the dial is rotated, and by adjustment of the distance of protrusion of the cam followers, the distance between the dial and the body can be accurately varied. Corresponding to each of the cam followers being caught in the notch in the cam surface as the dial is rotated a plurality of accurate distances of separation of the dial from the body is provided. Thus, a number of accurate positions of the dial with respect to the holder means are provided which greatly facilitates the accurate placement of the various mount wires. For example, the assembly of the crystal vibrator shown in Fig. 9 is begun as depicted in Fig. 7, and the cam followers allow for quick and accurate positioning of the mount wires along the length of the crystal. Ordinarily, a number of similar crystal vibrators will be assembled consecutively, and the cam followers and other adjustments of the jig will be preset so that it is not necessary to set all of the adjustments for each separate crystal vibrator to be assembled.

Figure 10:
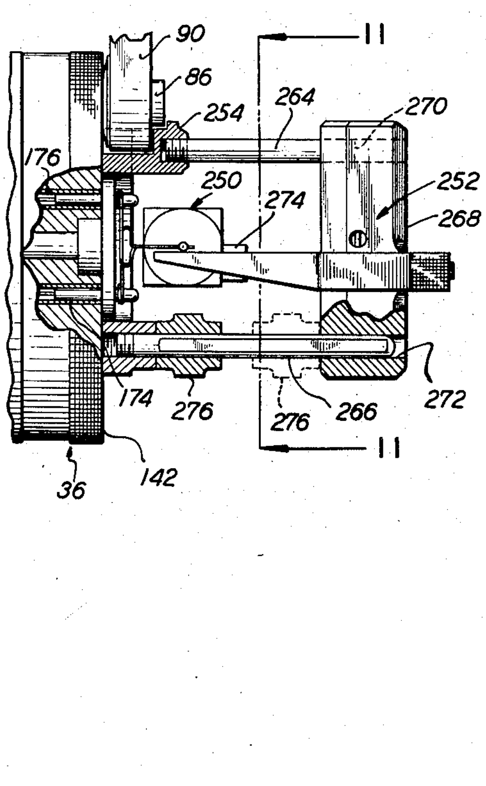
Fig. 10 is a side view partially in section of a special clamp means which may be attached to the front side of the dial member to facilitate the assembly of another type of conventional crystal vibrator.
Figure 11:
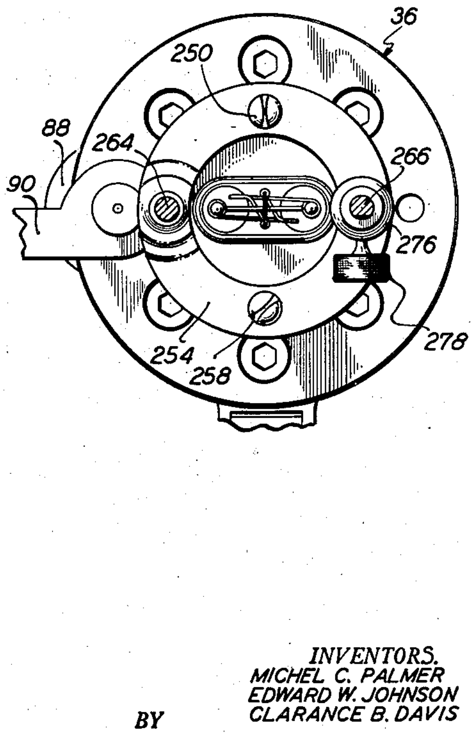
Fig. 11 is a view taken along line 11—11 of Fig. 10.

With reference to Figs. 9 to 11, a different kind of crystal vibrator 250 may be assembled by use of a special clamp means 252 in conjunction with an auxiliary support 254. The problem here is providing means for supporting the clamp, since the mount wires do not themselves extend away from the dial face far enough so that the clamp can be supported on them. Thus, to accomplish this support for the clamp, the auxiliary support is shaped like an annulus so that it does not interfere with the crystal vibrator assembly, and is connected to the front side of the dial by screws 256, 258 which thread into tapped holes 260, 262 (Fig. 2). A pair of posts 264, 266 are connected to the auxiliary support so that they extend in the direction normal to the front side of the dial. Further, a sleeve 276 is slidably mounted on the post 266 of the auxiliary support for providing a stop so that the special clamp means is slid to the proper position along the length of the posts. A set screw 278 secures the position of the sleeve 276.

The special clamp means 252 is similar to the clamp means 180, except that it has a larger mounting member 268 with larger holes 270, 272 extending through the member and a square stop 274 is provided on one of the prongs of the special clamp means to aid in positioning of the crystal with respect to the clamp.

The jig apparatus described is designed specifically to facilitate the assembly of a particular class of crystal vibrators. It should be understood that other structures, such as electron tubes, transistors, crystal diodes, precision switches, variable condensers, indicating meters, precision potentiometers, etc. may be assembled by use of the jig apparatus. Naturally, to use the jig apparatus in the assembly of any particular structure requires minor modifications in the jig apparatus so that it will conform to the parts to be assembled.

We claim:

1. Jig apparatus for facilitating the assembly of the component parts of electrical and mechanical structures comprising a body, a dial member rotatably and slidably connected to the body and spring loaded in the sliding direction toward the body, the dial having a front and back side with the back side facing toward the body, a plurality of adjustable cam followers protruding from the back side of the dial, a cam connected to the body and disposed facing the back side of the dial for engaging the followers as the dial is rotated to provide successively a plurality of distances of separation of the dial from the body, and means disposed on the front side of the dial for supporting component parts of the structure to be assembled.

2. Jig apparatus for facilitating the assembly of the component parts of electrical and mechanical structures comprising a body, a dial member rotatably and slidably connected to the body with the dial member being spring loaded in the sliding direction toward the body, the dial having means disposed on its face for supporting component parts of the structure to be assembled, and spacer means rotatably connected to the dial for providing preset distances of separation between components of the structure to be assembled that are supported from the face of the dial.

3. Jig apparatus for facilitating the assembly of the component parts of electrical and mechanical structures comprising a body, a dial member having a front side and a back side, a shaft rotatably and slidably connecting the dial to the body with the back side being proximate to the body, the shaft being spring loaded to urge the dial toward the body, a plurality of adjustable cam followers protruding from the back face of the dial, a cam connected to the body and disposed facing the back side of the dial for engaging the followers as the dial is rotated, means connected on the front face of the dial for supporting component parts of the structure to be assembled, spacer means rotatably connected to the dial for positioning the component parts supported from the front face of the dial, and holder means pivoted to the body for releasably holding additional components of the structure to be assembled in a position proximate to the components supported from the front face of the dial.

References Cited in the file of this patent

UNITED STATES PATENTS 1,795,195 Blom ------------------ Mar. 3, 1931